Sept. 19, 1950
T. C. AITCHISON ET AL
2,522,980
HOUSING AND MOUNTING FOR CAPACITORS
Filed March 19, 1948
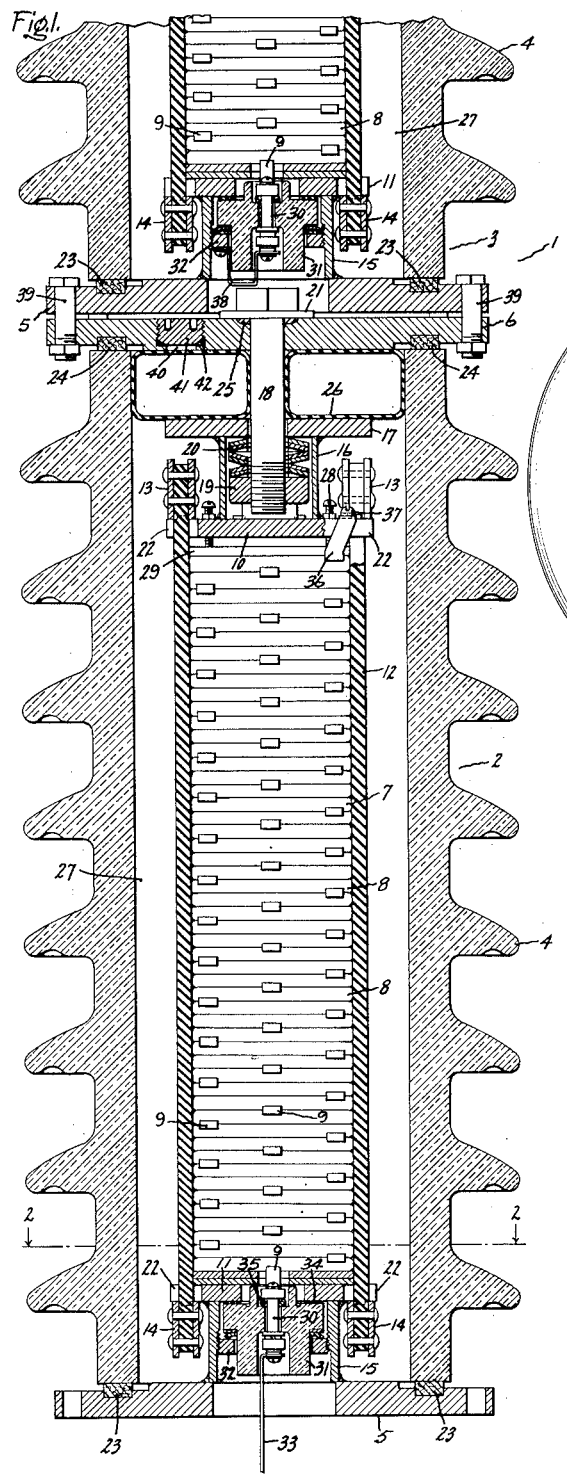
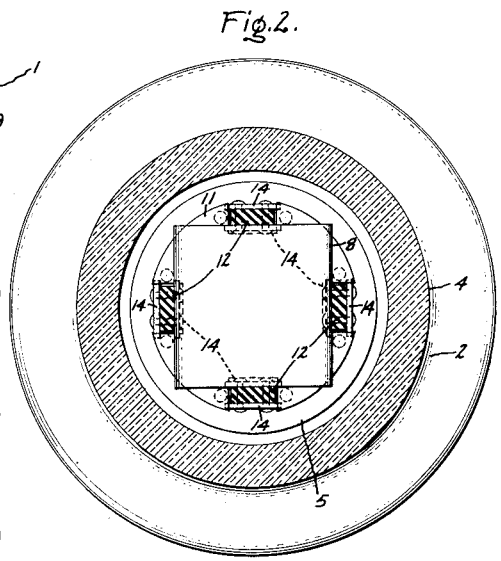
Inventors:
Thomas C. Aitchison,
John K. Easley,
by Ernest C. Britton
Their Attorney.

Patented Sept. 19, 1950

2,522,980

UNITED STATES PATENT OFFICE 2,522,980

HOUSING AND MOUNTING FOR CAPACITORS

Thomas C. Aitchison and John K. Easley, Pittsfield, Mass., assignors to General Electric Company, a corporation of New York Application March 19, 1948, Serial No. 15,764

1 Claim. (Cl. 174—52)

This invention relates to capacitors and more particularly to capacitors for use in coupling high voltage circuits to carrier current telephone circuits, voltage measuring circuits, and the like.

In the present construction of carrier current coupling capacitor units which are used to allow the passage of a high frequency carrier current but act as a low frequency high voltage insulator, the outer hollow insulating member is often placed under tension. Since these insulating members are usually constructed of porcelain or some similar frangible material, which is weak in tension but strong in compression, fracturing of the outer insulating member may sometimes occur. Also it has been necessary previously to keep the capacitor unit upright in order to prevent the mixing of the dielectric fluid which is contained within the hollow insulator and the gas in the expansion chamber at the top of the unit.

The capacitor construction which embodies the present invention overcomes both the tendency of the hollow insulator to fracture and the necessity of maintaining the capacitor unit in an upright position by placing the hollow frangible insulator under compression instead of tension and by completely enclosing the expansion chamber in a sealed elastic unit, thus isolating the gas from the dielectric fluid.

It is an object of this invention to provide a new and simple coupling capacitor construction which presents a capacitor unit possessing greater strength than has previously been achieved.

It is another object of this invention to provide a coupling capacitor construction which eliminates the necessity of maintaining the capacitor in an upright position.

It is a further object of this invention to provide a coupling capacitor in which fine adjustment of capacitance is easily achieved.

The invention will be better understood from the following description taken in connection with the accompanying drawing and its scope will be pointed out in the appended claims.

In the drawing Fig. 1 is a vertical cross section of a capacitor unit constructed in accordance with this invention; Fig. 2 is a horizontal cross section taken through the section 2—2 of the particular embodiment of this invention shown in Fig. 1.

Referring now to the drawing, there is shown therein by way of example, a coupling capacitor device 1 constructed, in the illustrated case, of two capacitor units, 2 and 3, connected in series. (Only a portion of capacitor unit 3 is shown in Fig. 1). Both capacitor units 2 and 3 may be identical in construction, but there is a slight difference in the external electrical connections between units. The capacitor units 2 and 3 each include an outer insulating shell 4, which may be constructed of porcelain or some other similar ceramic insulating material, mounted on a conducting base plate 5. The upper end of the shell 4 is closed by a cap 6 which may be constructed of metal. Thus an enclosed cylindrical volume is formed by the shell 4, the base plate 5, and the cap 6.

Within the hollow insulator 4 is mounted a capacitor roll stack 7 which is formed of a stack of small paper and metal foil capacitor units 8 all connected in series by the conductive tap-straps 9. The capacitor roll stack 7 is compressed between an upper clamping plate 10 and a lower clamping plate 11 which are held in place by four insulating tie-rods 12. To the upper and lower end of each of the tie-rods 12 are riveted, or similarly fastened, metal tension pieces 13 and 14.

The lower clamping plate 11, on which is mounted the capacitor roll stack 7, is fastened by welds, or similar means, to a hollow cylindrical stand 15 which is attached to the base plate 5. The upper clamping plate 10 is similarly fastened to a tube 16 which may be square on which is mounted a support plate 17 having an opening which accommodates a bolt 18 passing through the metal cap 6 and into the tube 16. A nut 19 which may be square and spring washers 20 which are located within the tube 16, are mounted on the shaft of the bolt 18. A washer 21 under the head of the bolt 18 rests on the external surface of the metal cap 6. Both the upper and lower clamping plates 10 and 11 have slots 22 cut in them to accommodate the insulating tie-rods 12. By the use of a press (not shown) the capacitor roll stack 7 is compressed and the insulating tie-rods 12 are placed in the slots 22. When the pressure of the press is removed the capacitor roll stack 7 expands and the clamping plates 10 and 11 are forced against the metal tension pieces 13 and 14. Thus a continuous physical connection between the metal cap 6 and the base plate 5 is achieved; the metal cap 6 has on its external surface a washer 21 which engages the head of bolt 18; bolt 18 passes through the cap 6 and has threaded on its shaft a nut 19 which forces the spring washers 20 against the support plate 17; plate 17 is mounted on the tube 16 which is fastened to the upper clamping plate 10; the metal tension pieces 13, which are riveted to the upper ends of the tie-rods 12 are forced against the upper clamping plate 10 by the action of the bolt 18 and the force exerted by the compressed capacitor roll stack 7;

the lower tension pieces 14 which are fastened to the tie rods 12 are similarly forced against the lower clamping plate 11 which is welded to the hollow cylindrical stand 15 which in turn is welded to the base plate 5. Therefore, turning the head of bolt 18 pulls the base plate 5 and the metal cap 6 closer together. This action compresses the gasket 23 which is located between the insulating shell 4 and the base plate 5, the gasket 24, which is located between the insulating shell 4 and the cap 6, the gasket 25, which is located under the washer 21, and also causes the insulating shell 4 to be placed under a compressive stress. The spring washers 20 provide a follow-up action which maintains a continuous positive compressive force on the gaskets 23, 24 and 25.

Mounted on the support plate 17 is, in the illustrated case, a modified torus-shaped expansion chamber 26 which is constructed of an elastic material such as rubber. The chamber 26 is filled with a gaseous substance and allows for the expansion and contraction of the dielectric fluid 27 which surrounds the capacitor roll stack 7 and is held within the insulating shell 5. Since the gas is separated from the dielectric fluid 27 by the elastic membrane of the chamber wall there is no danger of gas and dielectric fluid mixing even when the capacitor unit 2 is inverted.

Through the upper clamping plate 10 pass adjusting screws 28 which rest against a disk 29 lying on top of the uppermost paper capacitor unit 8. Thus, fine adjustments of the compressive force acting on the capacitor roll stack 7 and, therefore, fine adjustment of total capacitance may be achieved by use of the screws 28.

The external connection of the capacitor roll stack 7 to the carrier current equipment is achieved by connecting the lowest of the tap-straps 9 to a terminal post 30 which is mounted in an insulating member 31 which is held within the hollow cylindrical stand 15 by a threaded conductive collar 32 which is screwed into the tapped interior of the stand 15. Also fastened to the terminal post 30 is a conductive lead 33 which passes through an opening in the base plate 5 and is connected at its other extremity to the cooperating carrier current equipment. Gaskets 34 and 35 located between the insulator 31 and the bottom clamping plate 11, and between the terminal post 30 and the insulator 31, maintain an hydraulically tight seal to prevent the escape of the dielectric fluid 27. The upper end of the capacitor roll stack 7 is electrically connected to the upper clamping plate 10 through a conductive strap 36 which is fastened at one end to the uppermost tap-strap 9 and at the other end to a screw 37 mounted in the upper clamping plate 10. It can be seen that a low resistance path from the clamping plate 10 to the cap 6 is presented by the tube 16, the spring washers 20, the bolt 18, and the washer 21.

In stacking a capacitor unit 3 above a unit 2 the terminal post 30 of unit 3 is effectively connected in series with the uppermost tap-strap 9 of the unit 2. This is done by connecting a jumper 38 between the terminal post 30 of unit 3 and the threaded conductive collar 32. This electrically connects the terminal post 30 to the base plate 5 which is fastened to the metal cap 6 of the unit 2 by the clamping bolts 39. As previously mentioned, the cap 6 is electrically connected to the uppermost tap strap 9. The insulating shell 4 is completely filled with dielectric fluid 27, except for the gas space within the expansion chamber 26, through the hole 40 which is sealed by the plug 41 and the gasket 42.

While there has been shown and described a particular embodiment of this invention, it will be obvious to those skilled in the art that various changes and modifications may be made without departing from the invention, and, therefore, it is aimed in the appended claim to cover all such changes and modifications as fall within the true spirit and scope of the invention.

What we claim as new and desire to secure by Letters Patent of the United States is:

A coupling capacitor housing comprising, in combination, an elongated hollow open ended cylindrical ceramic insulating member, a gasketed metal cap over each end of said insulating member, the outer surfaces of said caps being flat and constituting the external end surfaces of said housing, the edges of said caps extending beyond said insulating member to provide flanges, registering holes in said flanges for accommodating bolts for fastening two of said housings together with their flat outer surfaces contiguous to each other, a clamping bolt, one of said caps having a relatively small center hole for accommodating the shank of said bolt with the head thereof adjacent the outer surface of said cap, the other of said caps having a larger center hole with the diameter greater than the diameter of the head of said bolt, a relatively short open ended cylindrical stand of substantially the same diameter as said larger hole in said other cap mounted coaxially therewith and extending into said insulating member, means for sealing one end of said cylindrical stand to the edges of said larger hole, a clamping plate for a capacitor stack attached to the other end of said cylindrical stand, a through conductor type insulating bushing for a lead from a capacitor stack mounted in said cylindrical stand, a second clamping plate in said insulating member parallel to and spaced from the first clamping plate, equally spaced peripheral notches in said clamping plates, insulating tie rods extending between said clamping plates and having portions thereof in said notches, cross members attached to the ends of said tie rods and extending beyond the sides of said notches, a tube attached at one end to said second clamping plate, a support plate attached to the other end of said tube, a hole in said support plate, the shank of said bolt extending through said hole in said support plate, a spring washer on said bolt in said tube, and a nut on said bolt in said tube, said tube having such shape and size as to prevent said nut from turning whereby when said bolt is tightened said spring washer is compressed thereby putting said tie rods in tension and said ceramic insulating member in compression.

THOMAS C. AITCHISON.
JOHN K. EASLEY.

REFERENCES CITED

The following references are of record in the file of this patent:

UNITED STATES PATENTS

| Number | Name | Date |
|---|---|---|
| 1,907,578 | Priess | May 9, 1933 |
| 2,397,551 | Leno | Apr. 2, 1946 |

FOREIGN PATENTS

| Number | Country | Date |
|---|---|---|
| 484,271 | England | May 3, 1938 |
| 492,332 | England | Sept. 19, 1938 |